(No Model.) 3 Sheets—Sheet 1.

J. SUYDAM.
AUTOMATIC PIPE COUPLING.

No. 461,532. Patented Oct. 20, 1891.

Witnesses.
John F. Nelson.
E. H. Glad

Inventor.
John Suydam
By H. A. West
Attorney (No Model.) 3 Sheets—Sheet 2.

J. SUYDAM.
AUTOMATIC PIPE COUPLING.

No. 461,532. Patented Oct. 20, 1891.

Witnesses.
John F. Nelson.

Inventor.
John Suydam
By H. A. West
Attorney (No Model.) 3 Sheets—Sheet 3.

J. SUYDAM.
AUTOMATIC PIPE COUPLING.

No. 461,532. Patented Oct. 20, 1891.

Witnesses.
John F. Nelson
E. W. L. Black

Inventor.
John Suydam
By H. A. West
attorney

UNITED STATES PATENT OFFICE.

JOHN SUYDAM, OF SCHENECTADY, NEW YORK.

AUTOMATIC PIPE-COUPLING.

SPECIFICATION forming part of Letters Patent No. 461,532, dated October 20, 1891.

Application filed February 24, 1891. Serial No. 382,392. (No model.)

*To all whom it may concern:*

Be it known that I, JOHN SUYDAM, of Schenectady, in the county of Schenectady and State of New York, have invented a new and Improved Automatic Pipe-Coupling for Railway-Cars, of which the following is a full, clear, and exact description.

My invention relates to an automatic coupling for the steam and air pipes used on railway-cars; and my object is to provide pipe-couplings which will act with certainty on backing the cars together without attention of any kind on the part of the train-hands, and which will at all times while the cars are coupled maintain a steam and air tight joint.

The invention consists, mainly, in constructing each coupler with an inclined spike or wedge, which enters a recess or guide in the opposing coupler and by an independent longitudinal movement, acting in conjunction with the opposing spike or wedge and the shell or casing, closes the abutting ends of the pipes together to form an air and steam tight joint.

My invention also consists in an automatic pipe-coupling in which is used a sliding tube, combined with a spike or wedge acted upon by a heavy spring and which has a longitudinal movement independent of the sliding tube, the taper of the spike serving to close the lapped ends of the opposite pipes together when the cars are coupled.

The invention also consists of the special construction of the various parts and their combinations, including the universal connection of the coupler to the cars, all as hereinafter described and claimed.

Figure 1:
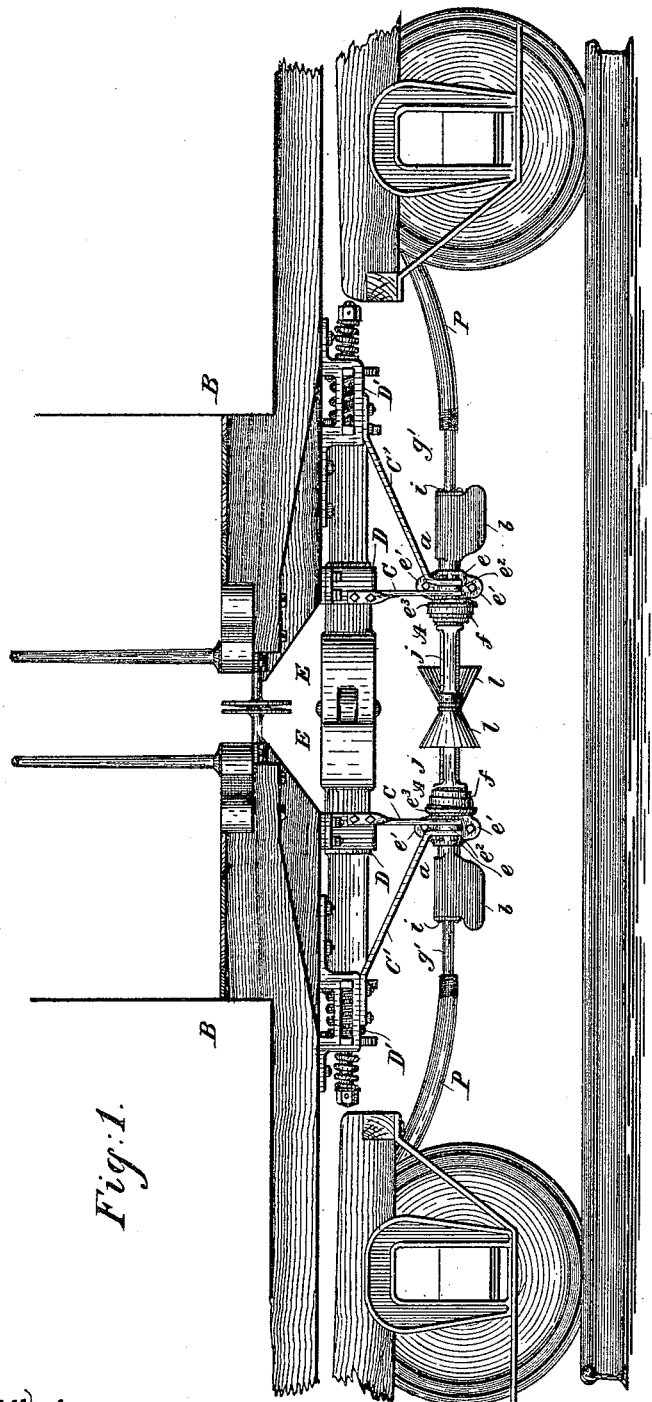
Figure 2:
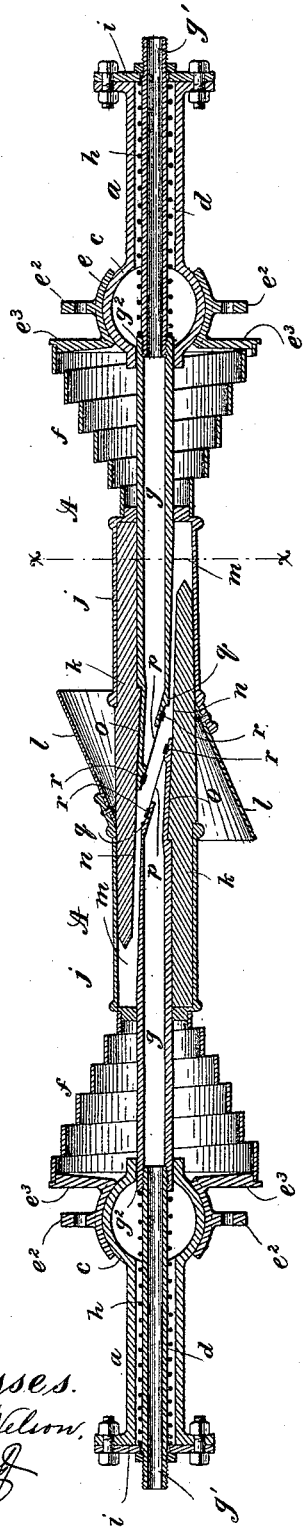
Figure 3:
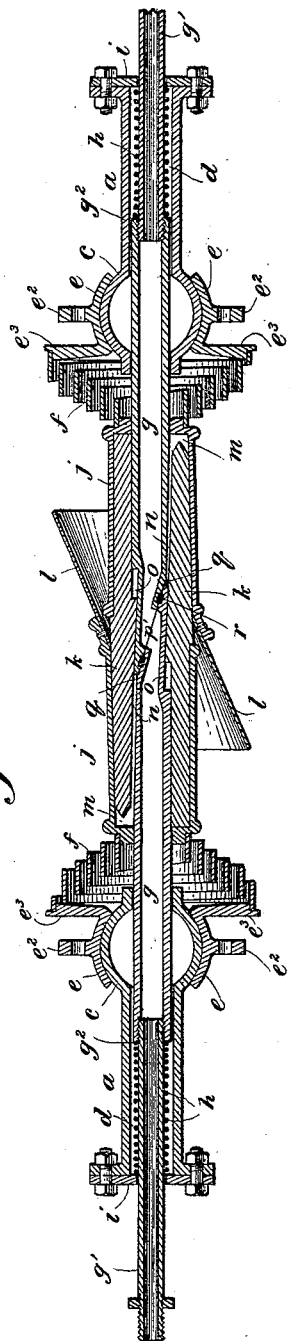
Figure 5:
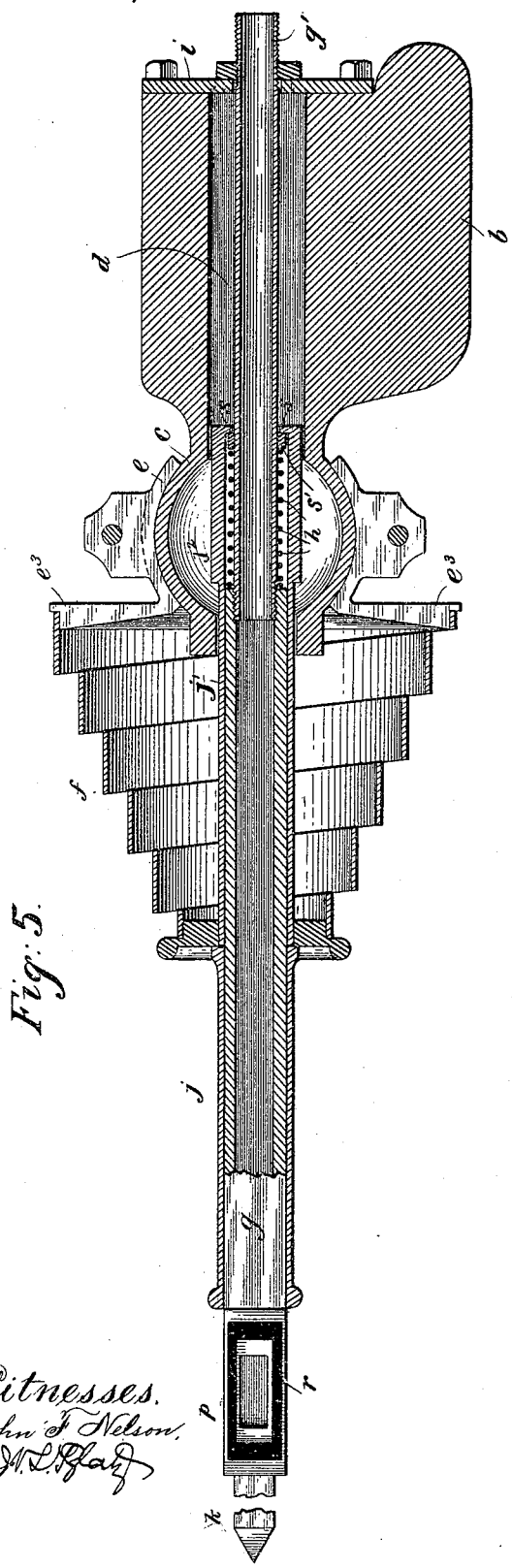
Figure 4:
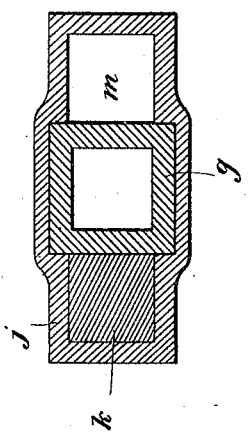

In the accompanying drawings, Figure 1 illustrates the application of my invention to railway-cars, showing the relative position of my automatic pipe-coupling to the ordinary automatic car-couplers, the parts of the pipe-coupling being shown in the position they assume when the cars are coupled together. Fig. 2 is an enlarged sectional plan view showing the parts in the position they occupy just before the coupling of the cars is effected. Fig. 3 is a similar view showing the parts in the position they assume when the joint is formed by the full coupling of the cars. Fig. 4 is a transverse sectional view on line $x\ x$ of Fig. 2, and Fig. 5 is a longitudinal sectional view showing a modification which enables the use of a short spring for pressing the tube forward and permitting it to yield in coupling.

The couplers A A are duplicates of each other, and are suspended from the bottom of the cars B B by hangers C C and braces C' C', attached, preferably, to the keepers D D' of the car-couplers E E.

$a$ represents a casing formed or provided with a weight $b$, ball $c$, and passage $d$ through it from end to end. The ball $c$ is clasped by two hemispherical castings $e\ e$, formed with top and bottom lugs $e'\ e'$, by which they are bolted upon the ball $c$, and also with side lugs $e^2\ e^2$, by which they are bolted to the hangers so that the coupling as a whole is connected to the car by a universal bearing, which accommodates itself to all movements of the car without strain upon or displacement of the pipes or joints. The hemispherical castings $e$ are also formed with a circular flange $e^3$, which forms a support for the base of the cone-spring $f$.

$g$ represents the tube fitted in the ball $c$. This tube may be made in two diameters, or it may be extended by a smaller tube $g'$ screwed into its inner end so that a shoulder $g^2$ is formed for the thrust of the coiled spring $h$. The tubes $g\ g'$, which constitute in effect a single tube, pass loosely through the cone-spring $f$, ball $c$, and passage $d$, and receive the hose $p$ at the rear end. The rear end of the said spring $h$ butts against the cap-plate $i$, bolted to the end of the casing $a$, so that said spring acts to thrust the tube forward and permit the tube to have a rearward movement in coupling, as below described. On said tube in front of the cone-spring $f$, is mounted a shield or casing $j$, the rear end of which fits in the point coil of the said cone-spring $f$. At one side of this casing is held the tapering spike or wedge $k$, while at the other side is held the flaring guide $l$, which leads to a narrow recess $m$ to receive the outer end of the opposite spike. The inner surface or edge of each spike is made tapering, as shown at $n$, which acts upon a corresponding bevel or any suitable contact $o$, on the adjacent surface of the tube $g$, so that when the spikes are driven forward into the recesses $m$, the bevels $n$, acting on $o$, will shift the ends of the tubes laterally and press them together with great force, forming an air and steam tight joint between them. The ends of the pipes are scarfed to match, as shown at $p$, to form a lap-joint and the end of each tube is notched or formed with a shoulder $q$ for the point of the opposite tube to strike against to insure perfect registration and prevent binding, and the inclined faces of the tubes may be provided with packing $r$ if found necessary.

In operation, the cars being backed together, the spike will first enter the guides $l$ and passages $m$, and the ends of the tubes will be brought in contact with each other—that is, the ends of the pipes will strike the shoulders $q$. At this time the cars are not yet coupled, but the longitudinal movement or further approach of the tubes ceases. The further movement of the cars necessary to couple them will cause the spikes $k$ to be driven into the passages $m$, causing at the same time compression of the heavy springs $f$. This movement of the spikes causes the bevels $n$ to close the lapped faces of the pipes together, forming a tight joint between them, as illustrated in Fig. 3. In uncoupling the cars the spikes are first drawn back, so that all pressure on the joint is relaxed, permitting the pipes to separate laterally without friction. There is no chafing of the beveled faces of the pipes, either in coupling or uncoupling. When the cars are uncoupled the weight $b$ and hose P serve to keep the coupler in horizontal position and in line with the center of the car, so that the opposing couplers will register when the cars are backed together. This may be effected by various other means.

In Fig. 5 I have shown a construction whereby a comparatively short spring $h$ may be used in place of a long spring, as shown in Figs. 1 and 2. For this purpose I form or provide the tube with a shell $j'$, formed with the hooks $s$ $s$, which retain the saddle $s'$, against which the rear end of the spring presses, and the passage $d$ is enlarged to permit the saddle and hooks to slide back therein the distance that the cone-spring $f$ is compressed. The front end of said shell $j'$ is secured to the collar to which the point coil of the cone-spring is attached, and it is formed with the stop $j^2$, to prevent displacement by the outward pressure of the cone-spring when the cars are uncoupled.

In my former application, Serial No. 364,066, I have shown and claimed an automatic pipe-coupler attached to the car-platform by a ball-and-socket connection, and a cone-spring applied to the coupler in front of the said connection, and a weight applied to the coupler at the rear of said connection, also a guide at the outer end of the coupler, and therefore lay no claim herein, broadly, to such subject-matter.

Having thus described my invention, what I claim, and desire to secure by Letters Patent, is—

1. The longitudinally-movable tube or pipe held to the car in a swiveled or universal connection and scarfed at the end and surrounded by a shell or casing, in combination with a spring arranged to press said casing forward on the tube, and a spike or wedge adapted to enter the opposite coupling and formed with a tapered or beveled surface to shift the scarfed end of the tube, substantially as described.

2. The longitudinally-movable tube or pipe scarfed at the end and surrounded by a shell or casing, in combination with a spring arranged to press said shell or casing forward on the tube, a spike or wedge held in said casing and formed with a tapered or beveled surface, and a weight for holding the coupling in horizontal position and in line with the center of the car, substantially as described.

3. In a pipe-coupling, the tube $g$ and spring $f$, placed thereon, in combination with the shell $j'$, pressed forward by the said spring, and the spike or wedge $k$, held in said shell and adapted to enter the opposite coupler and to shift the end of the pipe laterally, substantially as described.

4. In a pipe-coupler, the longitudinally-movable tube $g$, combined with a sliding shell held on said tube, and a wedge or spike held in said shell and arranged to slide on said tube, so that its tapered surface will shift the end of the tube, as and for the purposes set forth.

5. In a pipe-coupler, the longitudinally-movable tube $g$, having a scarfed end formed with a shoulder $q$, in combination with a sliding shell held on said tube, and a wedge or spike held in said shell and arranged to slide on said tube, substantially as and for the purpose set forth.

6. The hollow ball $c$, formed or provided with a hollow weight $b$ and held by casting $e$, in combination with the tube $g$, spring $n$, applied thereto, spring $f$, shell $j'$, placed on said tube and formed with a chamber or recess $m$ and provided with a guide $l$ and wedge or spike $k$, all arranged to operate substantially as described.

7. The hollow ball $c$, formed or provided with a hollow weight $b$ and held by casting $e$, formed with flanges $e^3$, in combination with the tube $g$, spring $h$, applied thereto, spring $f$, shell $j'$, placed on said tube and formed with a chamber or recess $m$ and provided with a guide $l$ and wedge or spike $k$, all arranged to operate substantially as described.

In testimony that I claim the foregoing as my invention I have signed my name, in presence of two witnesses, this 4th day of February, 1891.

JOHN SUYDAM.

Witnesses:
R. S. JANNY,
ARTHUR F. PEEBLES.